(12) United States Patent
Kimijima et al.

(10) Patent No.: US 6,682,853 B2
(45) Date of Patent: Jan. 27, 2004

(54) NONAQUEOUS ELECTROLYTE SECONDARY BATTERY AND METHOD OF MANUFACTURING THE SAME

(75) Inventors: Takaaki Kimijima, Fukushima (JP); Tsuyoshi Sugiyama, Miyagi (JP)

(73) Assignee: Sony Corporation, Tokyo (JP)

( * ) Notice: Subject to any disclaimer, the term of this patent is extended or adjusted under 35 U.S.C. 154(b) by 112 days.

(21) Appl. No.: 09/815,592

(22) Filed: Mar. 23, 2001

(65) Prior Publication Data
US 2002/0004171 A1 Jan. 10, 2002

(30) Foreign Application Priority Data
Mar. 23, 2000 (JP) ..................... P2000-081577

(51) Int. Cl.[7] .......... H01M 2/16; H01M 6/00; H01M 6/10
(52) U.S. Cl. .......... 429/246; 29/623.3; 429/94
(58) Field of Search ............ 429/94, 246; 29/623.3

(56) References Cited

U.S. PATENT DOCUMENTS 3,298,871 A * 1/1967 Binder et al. ............ 429/94
5,965,290 A * 10/1999 Shimizu et al. ........... 429/94
6,335,114 B1 * 1/2002 Ueshima et al. .......... 429/94
6,428,934 B1 * 8/2002 Hatazawa et al. ..... 429/231.95

FOREIGN PATENT DOCUMENTS

DE          1496222      7/1964
JP          62272473     11/1987

* cited by examiner

Primary Examiner—Patrick Ryan
Assistant Examiner—Thomas H. Parsons
(74) Attorney, Agent, or Firm—Sonnenschein, Nath & Rosenthal LLP

(57) ABSTRACT

A nonaqueous-electrolyte secondary battery prevents a short circuit between a positive electrode and a negative electrode even if pressure is applied from the outside, or stress is generated by folding applied thereon, during the battery manufacture, or when the battery is used as a product. The lithium ion battery includes a structure in which the positive electrode, gel-type macromolecular solid electrolyte layers in the positive electrode, separators, gel-type macromolecular solid electrolyte layers in the negative electrode, and the negative electrode are laminated; and two covering members are provided at ends of the positive electrode and the negative electrode, with two pairs of covering members disposed opposed to each of the two covering members.

13 Claims, 1 Drawing Sheet

| Level | Disposition of insulation member | The ratio of inside short circuit (%) |
|---|---|---|
| 1 | Not disposed | 70.0 (%) |
| 2 | Disposed in ends of electrodes | 10.0 (%) |
| 3 | Disposed on one electrode oppose to an end of the other | 0.3 (%) |
| 4 | Disposed on one electrode oppose to an end of the other and ends of electrodes | 0.1 (%) |

NONAQUEOUS ELECTROLYTE SECONDARY BATTERY AND METHOD OF MANUFACTURING THE SAME

CROSS-REFERENCE TO RELATED APPLICATION

The present application claims priority to Japanese Application No. P2000-081577 filed Mar. 6, 2000 which application is incorporated herein by reference to the extent permitted by law.

BACKGROUND OF THE INVENTION

1. Field of the Invention

The present invention relates to a nonaqueous-electrolyte secondary battery and a method of manufacturing the same, more particularly, to a lithium ion battery such as a lithium ion polymer secondary battery having a gel-type or plasticizing macromolecular electrolyte layer.

2. Description of the Related Art

In recent years, accompanying by a situation that portable small electric equipment such as small, lightweight mobile phones, or portable computers, has been popularized, secondary batteries having small, reliable output characteristics and capable of longtime-use by re-charging many times such as nickel-cadmium batteries, nickel-metal hydride batteries and lithium ion batteries have been studied and developed vastly as an electric source for supplying electric power to drive the electric equipment.

Among the secondary batteries, the lithium ion secondary battery has characteristics capable of outputting stable electric power despite its being small, lightweight and thin in size, and the battery has been studied and developed for the purpose of being employed as a foldable secondary battery by taking advantage of suitable structural characteristics for its thin size. For realizing a thinner size or a foldable shape as described above, it is suggested that a technique employ a gel-type electrolyte including plasticizer, to achieve flexibility, and a technique which employs macromolecular solid electrolyte, in which a lithium salt is dissolved in a macromolecular material, is used.

With a gel-type electrolyte or macromolecular solid electrolyte, excellent characteristics as a so-called dry cell, which is free of leakage unlike the case of using liquid-type electrolyte. However, there is a tendency such that enough electrical contact between positive and negative electrodes, can not be attained by only laminating the positive and negative electrodes and electrolyte corresponding to those electrodes. This is attributed to the reason that the gel-type, or macromolecular solid electrolyte does not have flowability the same as the liquid-type electrolyte do, so that the electrolyte and the electrodes does not contact hermetically.

In the case that a satisfactory electrical contact between the electrodes and the electrolyte can not be achieved, contact resistance inside the battery increases, thereby increasing electrical loss, which is undesirable for battery characteristics. In the case that a sufficient contact area between the electrolyte and the electrodes can not be achieved, desired ion mobility can not be gained therebetween, which decreases battery capacity less than the ordinal capacity. Accordingly, in the lithium ion battery employing the gel-type electrolyte or the macromolecular solid electrolyte as the electrolyte, it is preferable that electrolyte layers and active material layers of the electrodes contact hermetically in order to realize excellent electrical contact, which reduces the inside resistance to a minimum, and obtains the best battery capacity.

For obtaining excellent electrical contact between the electrolyte layers and the active material layers of the electrodes, it is suggested that a technique is used for changing parts where the electrolyte layers and the active material layers do not contact, or where the electrolyte layers and the active material layers do not contact partly, such that desirable contact is achieved by applying pressure from the outside, when laminating the electrolyte layers and the active material layers of the electrodes in order to form a laminating structure comprising contents inside the battery.

An invention using positive mixed materials with doped macromolecular solid electrolyte to positive electrode active layers, is suggested in Laid Open JP. No. Hei 2 (1990)-40867, for instance. This is a technique such that part of a macromolecular solid electrolyte is mixed with the positive electrode active material layers, which improves electrical contact between the macromolecular solid electrolyte and the positive electrode active material layers. However, in the case that such technique is employed for improving contact from the chemical point of view, if a satisfactory structural (physical) contact between the electrolyte layers and the electrodes is not achieved, electrical contact therebetween tends to be poor. For this reason, pressure is desirable to be applied to the laminating structure from the outside in order to gain sufficient structural contact.

Recently, as for an appropriate battery for cellular phones, portable computers and portable game machines, which has been popularized dramatically, a thin lithium ion battery has been noticed. For realizing the best appropriate thin lithium ion battery for this use, it is suggested that a structure is made in a manner that film-like electrolyte or foil-like electrodes and so on are laminated to form a laminating structure inside the battery, or are further rolled and compressed, and accommodated into film-like or thin-board like package members.

In the above-mentioned method, however, when the electrolyte layers and the electrodes are laminated and is applied pressure from the outside, a position exposed toward the outside without being covered with the electrolyte layers at an end of either the positive electrode or the negative electrode is pressurized or folded with pressure generated at this moment,to contact the other electrode, which causes short circuit between both electrodes.

Particularly, in the thin lithium ion battery, when a user adds strong force in order to put the battery into the main body of electrical equipment after manufacturing, or drops, or applies pressure to the battery, pressure is likely to be applied to the laminating structure of the battery, and in the case of the foldable thin battery, pressure attributed to that folded shape is applied to the laminating structure. As a result of this, in ends of the electrodes, specifically, parts exposed toward the outside without being covered with the electrolyte layers, contact the other electrode, thereby causing a short circuit between both electrodes.

In addition, in the lithium ion battery including the gel-type electrolyte layer, which has high flowability and poor strength, inside the laminating structure, when pressure is applied to the laminating structure from the outside, the gel-type electrolyte layer is likely to be deformed physically, thereby the ends of one electrode tends to contact the other electrode.

With the reason that excellent throughput achieves cost reduction, the positive electrode, the negative electrode and the lead electrode are stamped out (a cutting process) with a metal mold and so on, however, a protrusion such as cutting burr or curling is likely to occur in cutting ends thereon. In the case that such a protrusion occurs in one electrode, when manufacturing or using the battery, the protrusion contacts the other electrode, thereby causing a short circuit.

As another case, internal stress is generated in the electrolyte or the electrodes, which changes positions of the ends of the electrode due to seclusion change or temperature variation, thereby causing a short circuit between the both electrodes.

In the case of instigating a short circuit between both electrodes as mentioned above, effective electromotive force or battery capability of the battery seriously decreases, and much worse, no electric power output results.

SUMMARY OF THE INVENTION

The invention has been achieved in consideration of the above problems and its object is to provide a lithium ion battery capable of preventing a short circuit between both electrodes when manufacturing or using the battery as a product, and a method of manufacturing the same.

A nonaqueous-electrolyte secondary battery according to the present invention includes a laminating structure, in which a gel-type or plastic electrolyte layer, a positive electrode, and a negative electrode are laminated, and a covering member having insulation for covering one electrode opposed to a position exposed toward the outside at least from the electrolyte layer in the other electrode in an end of at least either one of the positive electrode and the negative electrode.

A nonaqueous-electrolyte secondary battery according to the present invention comprises a laminating structure, in which a gel-type or plastic electrolyte layer, a positive electrode, and a negative electrode are laminated, and a covering member having insulation and physical strength for covering one electrode opposed to a position exposed toward the outside at least from the electrolyte layer in the other electrode in an end of at least either one of the positive electrode and the negative electrode even if pressure is applied to the laminating structure.

In a case that the above-mentioned nonaqueous-electrolyte secondary battery is a solid electrolyte battery, or gel-type electrolyte, as a macromolecule material employed for macromolecular solid electrolyte, silicon gel, acryl gel, acrylonitrite gel, polyphosphazen denatured polymer, polyethylene oxide, polypropylene oxide, and composite polymer of the above-mentioned materials, cross-linked polymer of the above-mentioned materials, and a denatured polymer of these materials can be employed; as for a fluorine polymer, for example, polyvinylidenefluoride, poly(vinylidenefluoride-co-hexafluoropropylene), poly(vinylidenefluoride-co-tetrafluoroethylene) and mixture of these materials can be employed. Various materials can be also employed as the same as the above-mentioned materials.

For a solid electrolyte, or gel-type electrolyte laminated on a positive electrode active layer, or a negative electrode active layer, the following processes make preferable materials. First, a solution comprising a macromolecular compound, an electrolyte salt, and a solvent, is impregnated into the positive electrode active material, or the negative electrode active material, and solvents removed, and is solidified. A solid electrolyte or gel-type electrolyte laminated on the positive electrode active layer, or the negative electrode active layer is impregnated into the positive electrode active layer, or the negative electrode active layer, and solidifies. In the case of cross-linked materials, after the above-mentioned process, light or heat is applied to conduct cross-liking to solidify the materials.

A gel-type electrolyte is made of a plasticizer including a lithium salt and a matrix macromolecule in the range of equal to or more than 2% by weight and equal or less than 3% by weight. At this moment, esters, ethers, and carbonic acid esters can be employed independently, or as one component of the plasticizer.

When adjusting a gel-typed electrolyte, as a matrix macromolecule gelling the above-mentioned carbonic acid esters, although various macromolecules are employed for forming a gel-type electrolyte, fluorine macromolecules such as poly(vinylidenefluoride), poly(vinylidenefluoride-co-hexafluoropropylene) are preferably employed from a reduction-oxidation stability point of view.

Macromolecular electrolyte is made of a lithium salt and a macromolecular compound, in which lithium salt is dissolved. As the macromolecular electrolyte, ether macromolecules such as polyethylene oxide and cross-linked polyethylene oxide, poly(methercrylate-ester), acrylates, fluorine macromolecules such as poly(vinylidenefluoride), poly(vinylidenefluoride-co-hexafluoropropylene) can be employed independently, or as a mixture, among the above-mentioned materials, preferably, fluorine macromolecules such as poly(vinylidenefluoride) or poly(vinylidenefluoride-co-hexafluoropropylene) can be employed from reduction-oxidation stability point of view.

As a lithium salt included in such a gel-type electrolyte or macromolecular solid electrolyte, a lithium salt used for typical electrolyte for a battery can be employed. In more detail, the following materials are considered: lithium chloride; lithium bromide; lithium iodide; chloric lithium; lithium perchlorate; lithium bromate; lithium iodate; lithium nitrate; tetrafluorolithiumborate; hexafluorophosphoriclithium; lithium acetate; bis(trifluoromethanesulfonil) imidelithium, $LiA_sF_6$, $LiCF_3SO_3$, $LiC(SO_2CF_3)_3$, $LiAlCl_4$, $LiSiF_6$. In the case of the gel-type electrolyte, preferable dissolution density of a lithium salt is in the range of 0.1 to 3.0 mol in plasticizer, more preferably, in the range of 0.5 to 2.0 mol. Additionally, the kinds of lithium salt or dissolution density of are not limited by the above-mentioned materials and dissolution density.

As a negative electrode material, a material capable of doping or un-doping lithium is preferable. As such a material, for example, a non-graphitizing carbon material or a graphite material is preferably employed. More detail, pyrocarbons, cokes (pitch coke, needle coke, petroleum coke), graphites, glassy carbons, an organic macromolecular compound calcinated material (a material such that phenolic resin, furan resin and the like are calcinated at proper temperature), carbon fiber, a carbonaceous material such as activated carbon, can be employed. As other materials, a macromolecule such as polyacetylene, polypyrrole or an oxide such as $SnO_2$ can be employed. In a case of forming a negative electrode using such materials, well-known binders may be used.

On the other hand, a positive electrode can be formed by employing a metal oxide, metal sulfide or a specific macromolecule as a positive electrode active material depending on the battery to be achieved. Take the case where a lithium ion battery is formed, for instance, as for the positive electrode active material, transition metal chalcogen compound, ex. metal sulfide, or metal oxide including no lithium such as $TiS_2$, $MoS_2$, $NbSe_2$, $V_2O_5$, or lithium complex oxide mainly including $LiMO_2$ and the like can be employed. As a transition metal M forming lithium complex oxide, Co, Ni, Mn are preferable. $LiCoO_2$, $LiNiO_2$, $LiNiyCo1-yO_2$ and the like can be considered as specific examples of such lithium complex oxide. In the formula described before, M is equal to or more than one kind of transition metal, x is a value in accord with a discharge state of the batteries, typically in the range of 0.05 to 1.10, and y is a value satisfying the formula:$0<y<1$. These lithium complex oxides are capable of generating high voltage, which forms the positive electrode active material having excellent characteristics in energy density. When forming a positive electrode using the positive electrode active material, well-known conducting agents or binders can be doped.

Here, as for a whole structure of the battery, several types can be considered as follows: a laminated type, which the positive electrode and the negative electrode are laminated with a solid electrolyte in-between by turns, a rolled type, which the positive electrode and the negative electrode are laminated with a solid electrolyte layer in-between, a folded type, which the positive electrode and the negative electrode are laminated with the solid electrolyte layer in-between, then folded by turns. Any type can be selected arbitrarily.

A nonaqueous-electrolyte secondary battery according to the present invention has a laminating structure in which a gel-type or plastic electrolyte layer, a positive electrode and a negative electrode are laminated, and a covering member covering a position exposed at least from the electrolyte layer toward the outside in the other electrode in an end of at least either one of the positive electrode or the negative electrode.

A nonaqueous-electrolyte secondary battery according to the present invention is a nonaqueous-electrolyte secondary battery including a laminating structure, in which a gel-type or plastic electrolyte layer, a positive electrode and a negative electrode are laminated, and includes a covering member, which covers a position on one electrode exposed at least from the electrolyte layer toward the outside in the other electrode in an end of at least either one of the positive electrode and the negative electrode, and has insulation and physical strength for electrically insulating one electrode to the other electrode, even if pressure is applied to the laminating structure.

A method of manufacturing a nonaqueous-electrolyte secondary battery according to the present invention comprises a step of covering a position on one electrode opposed to a position exposed at least from an electrolyte layer toward the outside in the other electrode in an end of at least either one of a positive electrode and a negative electrode with a covering member having insulation and physical strength for insulating one electrode to the other electrode, even if pressure is applied to the laminating structure before a step of applying pressure to the laminating structure from the outside.

A method of manufacturing a nonaqueous-electrolyte secondary battery according to the present invention includes a step of covering a position on one electrode opposed to a position exposed at least from the electrolyte layer toward the outside in the other electrode in an end of either one of the positive electrode or the negative electrode, before a step of applying pressure to the laminating structure from the outside.

In a nonaqueous-electrolyte secondary battery and a method of manufacturing the same according to the present invention, a covering member having insulation covers a position on one electrode opposed to a position exposed at least from the electrolyte layer toward the outside in the other electrode in an end of at least either one of the positive electrode and the negative electrode. The covering member having insulation covers a position on one electrode opposed to a position exposed at least from an electrolyte layer toward the outside in the other electrode in either one of the positive electrode and the negative electrode. Thereby, even if one electrode is deformed in manner of approaching the other electrode due to any causes, the covering member prevents a short circuit between both electrodes.

The covering member has insulation and physical strength for electrically insulating one electrode from the other electrode even if pressure is applied to the laminating structure, in which the electrolyte layer, the positive electrode and the negative electrode are laminated. Thereby even if the end of one electrode is deformed in a manner of approaching the other electrode seriously due to strong pressure, which is applied to the laminating structure inside the battery, the covering member can prevent an electrical short circuit between both electrodes.

Other and further objects, features and advantages of the invention will appear more fully from the following description.

BRIEF DESCRIPTION OF THE DRAWINGS

These and other objects and features of the present invention will become clear from the following description of the preferred embodiments given with reference to the accompanying drawings, in which.

DETAILED DESCRIPTION OF THE PREFERRED EMBODIMENTS

Figures 1, 2:
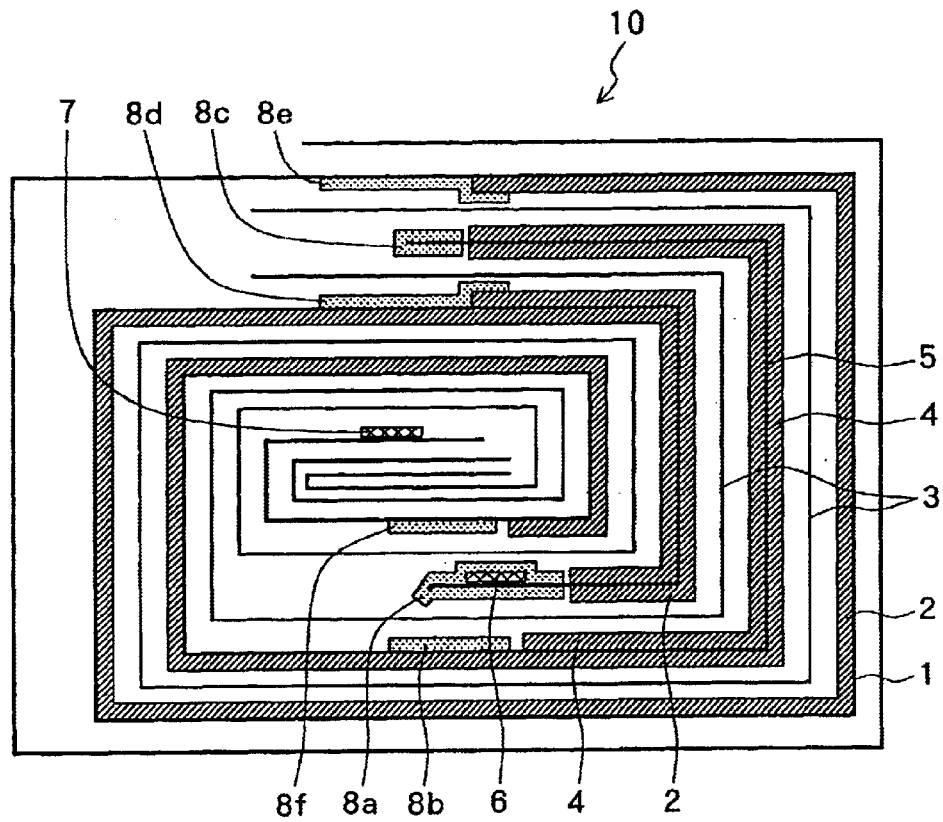
FIG. 1 is a view showing a general structure of a lithium ion polymer secondary battery relative to an embodiment of the present invention.
FIG. 2 is a view showing experimental results observed a ratio of generating inside short circuit of the lithium ion polymer secondary battery relative to the embodiment.

Embodiments of the invention will be described in detail hereinbelow by referring to the drawings.

FIG. 1 is a view showing a general structure of a lithium ion polymer secondary battery relative to an embodiment of the present invention. In FIG. 1 and the explanation based on FIG. 1, for simplifying the explanation and the drawing, a part of a laminating structure inside the lithium ion polymer secondary battery will be particularly selected and explained. Other structures such as package members are omitted; such as a film-like or sheet-like package member covering the laminating structure.

The lithium ion polymer secondary battery has the laminating structure 10, in which a positive electrode 1, gel-type macromolecular solid electrolyte layers 2 in the positive electrode, separators 3, gel-type macromolecular solid electrolyte layers 4, and a negative electrode 5 are laminated and compressed after rolling many times in a manner so that it occupies less area. Further, as for the main structure inside the lithium ion polymer secondary battery, a lead electrode 6 in the positive electrode side and a lead electrode 7 in the negative electrode side, covering members 8a, 8b, 8c, 8d, 8e, 8f are included therein.

For simplifying the drawing, although FIG. 1 shows the laminating structure 10 illustrated such that it is rolled twice around a center position between the lead electrode 6 in the positive electrode side and the negative electrode 7 in the negative electrode side are in a manner that those lead electrodes are positioned close to the center, in practice, the laminating structure 10 may be further rolled many times.

With the reason that preferable characteristics such as excellent conductivity and chemical characteristics as an electrode, excellent workability in a rolling process, lightweight and low-cost and so on are obtained, the positive electrode 1 is formed by coating a positive electrode active material on a foil-like metal electrode attained by cutting rolled aluminum foil in predetermined outer dimensions. When cutting the electrode itself, for the reason of excellent throughput and mass production, typically, a mechanical cutting method is preferably conducted with metal mold and so on, however, a protrusion such as a cutting burr, or curling are likely to occur in its cut ends.

The negative electrode 5 is formed by coating negative electrode active materials on a metal electrode by cutting rolled copper foil in predetermined outer dimensions with the almost same reason as the above-mentioned positive electrode 1. With a similar manner to the positive electrode 1, since the mechanical cutting method stamp out with the metal mold and so on, a protrusion such as a cutting burr, or curling are likely to occur in its ends.

The lead electrode 6 in the positive electrode side and the lead electrode 7 in the negative electrode side are together for taking electromotive force generated in the laminating structure 10 outside. Those lead electrodes are formed by stamping a thin aluminum alloy plate, which has excellent conductivity and durability for a chemical reaction generated inside the laminating structure 10 with the metal mold, and cut using the mechanical cutting method in a similar manner to the above-mentioned electrodes. As a result of this, in its ends, a protrusion such as cutting burr, or curling are likely to occur.

The gel-type macromolecular solid electrolyte layers 2 in the positive electrode side and the gel-type macromolecular solid electrolyte layers 4 in the negative electrode side have preferable electrochemical characteristics as the electrolyte layer in each of the electrodes, and are allowed to be folded or deflected without leakage caused by the liquidated electrolyte. As a material satisfying such characteristics, a material, in which electrolyte is diffused in a matrix macromolecular uniformly, is preferable.

The separators 3 are used for separating the macromolecule solid electrolyte layer 2 in the positive electrode side and the macromolecule solid electrolyte layer 4 in the negative electrode side in a manner to prohibit both macromolecule electrolyte layers from being mixed. As their materials, a material capable of moving ions freely between the positive electrode and the negative electrode such as microporous polypropylene (film) or polyethylene (film), is preferable.

The covering materials 8a, 8b, 8c, 8d, 8e, 8f, disposed in each of the positions are made of a material having insulation electrically insulating between the two electrodes even if one electrode is adjacent to the other electrode by applying pressure on the laminating structure 10 from the outside, and having a thickness and a property including mechanical strength such that the covering members are not torn or damaged even if one electrode is deformed and contacts the other electrode. The materials are made of adhering tape made of polyimide or polypropylene in given parts.

The positive electrode 1 and the negative electrode 5 are generally formed such that their ends having extra lengths are longer than that of macromolecular solid electrolyte layers 2. As for the reason, when the laminating structure 10 is formed by applying or adhering the macromolecular solid electrolyte layers 2 and 4 on the principal faces of each of the electrodes, the macromolecule solid electrolyte layers 2 and 4 can contact the electrodes. In connection with this, the amount of such exposed (protruded) ends in the electrodes tends to further increase for the reason that each of electrodes is shifted to the position to be disposed when a rolling process is conducted by applying pressure after forming the laminated layers. Additionally, since the gel-type macromolecular solid compound electrolyte layers 2 and 4 are flexible in shape, if the laminating structure 10 has pressure applied from the outside when a battery is manufactured or used as a product, the exposed parts of the macromolecular solid electrolyte layers 2 and 4 in the ends of the positive electrode 1 and the negative electrode 5, are adjacent each other.

Despite the above-mentioned state, the covering members 8a and 8c are provided in the ends of the positive electrode 1 and the negative electrode 5, and additionally, the covering members 8b and 8f, 8d and 8e are respectively provided in positions on one electrode opposed to the other electrode, in which the covering members 8a or 8c is provided, thereby protecting the parts in which each of the covering members are disposed from a short circuit caused between both electrodes. Accordingly, electrical short circuit occurring between the positive electrode 1 and the negative electrode 5 can be prevented even if pressure is applied to the laminating structure 10 from the outside.

Here, the covering members are not disposed in the ends, to which the lead electrode 7 in the negative electrode 5 side is connected. With the reason that as shown in FIG. 1, only the negative electrode 5 is rolled and facing each other, a short circuit occurs in such a negligible short distance, which hardly causes any substantial adverse effects on an amount of electromotive force as a battery.

Next, a general outline of the method of manufacturing the lithium ion polymer secondary battery will be particularly explained with mainly describing a step of forming the covering members and a step of applying pressure on the laminating structure 10.

As described before, the positive electrode 1, the macromolecule solid electrolyte layers 2 in the positive electrode side, the separators 3, the macromolecule solid electrolyte layers 4 in the negative electrode side, the negative electrode 5 are laminated, the lead electrode 6 in the positive electrode side connects to the positive electrode 1, whereas, the lead electrode 7 in the negative electrode side connects to the negative electrode 5, which forms the unrolled flat laminating structure 10.

Before rolling the laminating structure 10 into a spiral shape, the covering member 8a adheres around the exposed part, in which the macromolecular solid electrolyte layers 2 are not disposed in the end of the positive electrode 1 in a manner of covering a surface of the lead electrode 6 on the positive electrode side. The covering member 8a is made of polyimide tape having insulation and physical strength. On the other hand, the covering 8c made of the polymide tape, adheres around the exposed part where the macromolecular solid compound electrolyte layers 4 are not disposed in the negative electrode 5.

At this moment, while the covering members 8b and 8f made of the polymide tape are adhered in a manner to cover the parts in the negative electrode 5 opposed to the end of the positive electrode 1, the covering members 8d and 8e made of the polymide tape adhere in a manner to cover the parts in the positive electrode 1 opposed to the end of the negative electrode 5. After the laminating structure 10 is rolled in a spiral shape and processed into a flat shape by applying pressure, the covering members 8b, 8e, 8d and 8f adhering on the electrodes in the opposite sides, are desirably disposed in expected positions and sizes such that each of the ends in the electrodes is opposed to one another; that is, in positions and sizes which compensate for shift or error allowances and so on caused by processing the electrodes.

As mentioned above, after adhering each of the covering members 8a, 8b, 8c, 8d, 8e and 8f, while the laminating structure 10 is rolled in a slightly flat spiral shape and further flattened for thinning in size by applying pressure, an electrical contact state between each of the electrodes 1 and 5 laminated inside the laminating structure 10 and each of the macromolecular solid electrolyte layers 2 and 4 corresponding to each of the electrodes 1 and 5, becomes further stable. At this moment, even if the case such that the end of the positive electrode 1 is adjacent to the negative electrode 5, or the end of the negative electrode 5 is adjacent to the positive electrode 1, which is caused by applying pressure, each of the covering members 8a, 8b, 8c, 8d, 8e and 8f can prevent generation of a short circuit caused by contacting the electrodes.

The thin laminating structure 10 as described above is accommodated in unillustrated package members, which can manufacture the main part of the lithium ion polymer secondary battery relative to the embodiment.

Obviously many modifications and variations of the present invention are possible in the light of the above teachings. It is therefore to be understood that within the scope of the appended claims the invention may be practiced otherwise than as specifically described.

EXAMPLE

An experiment on observing a ratio of generating an inside short circuit (i.e., short circuit between the electrodes) in a plurality of the lithium ion polymer secondary batteries relative to the embodiment, were conducted. However, in the experiment, for the purpose of comparing the effects on each of the various structures, as shown in FIG. 2, the ratios of generating the inside short circuit in each of the following cases were observed. Such cases were: a case that any covering members are not disposed (level 1), a case that the covering members 8a and 8c are only disposed in the ends of each of the electrodes (level 2), a case that the covering members 8b, 8d, 8e and 8f are only disposed in positions on the electrodes opposed to the ends of each of the electrodes (level 3), a case that the covering members 8a, 8b, 8c, 8d, 8e and 8f are disposed in all given positions as the above-described embodiment, that is, the ends of each of the electrodes and the positions on the electrodes are opposed to the ends of each of the electrodes (level 4).

As a result of this, the ratio of generating the inside short circuit in level 1 was 70%, which showed that the inside short circuit occurred with quite high probability. The ratio in level 2 was 10%, which showed that the ratio greatly decreased. Further, the ratio in level 3 was 0.3%. The ratio in level 4 considerably decreased and was 0.1%, which showed that the inside short circuit virtually did not occur.

Here, in the experiment, for the purpose of observing effects on the covering members 8a, 8b, 8c, 8d, 8e and 8f relative to the embodiment, much greater pressure than pressure applied to the typical manufacturing method and condition for use, was experimentally applied, then under these conditions, the ratio of generating the inside short circuit was observed. Accordingly, since the experimental results were conducted under the condition, in which the safe ratio was set quite high, especially in the case of levels 3 and 4, during an actual manufacturing step, or while a battery is used as a product, it is considered that no inside short circuit substantially occurred. In addition, in the case of level 2, the ratio of generating the inside short circuit generated during an actual manufacturing step, or while the battery is used as a product, was in a range of a few percent or even less.

Although in the above-mentioned embodiment, the case that the structure of the lithium ion battery according to the present invention and the method of manufacturing the same was applied to the structure of the main part of the thin lithium ion polymer secondary battery and the method of manufacturing the same was described, the present invention is not limited by this case. Besides this, for example, any materials such as the electrolyte layers made of materials except macromolecular solid electrolytes, or electrolytes whose quality is gel or plastic, materials having electrodes made of materials excellent in flexibility, can be applied. As for the quality of the positive and negative electrodes, metal materials employed as the lead electrodes and so on are not limited by the materials exemplified in the above-described embodiment.

Although in the above-mentioned embodiment, the polymide tape was employed as the covering members, the covering members may be formed such that insulation films are deposited in given parts in a manner that the film result in having insulation or physical strength as mentioned above. The technique described in the above-mentioned description can be applied to a tube-shaped lithium ion battery formed by rolling a laminating structure and accommodating it in a cylindrical package member. As for the reason, in the case of the tube-shaped lithium ion battery in this embodiment, pressure is often required to be applied to the laminating structure in a manufacturing step. Since it is suggested that one technique achieves improvement of electromotive force or continuous performance output of the battery by applying pressure to the center of the battery from its sides from the outside of the battery, in such cases, pressure may be applied when the tube-shaped lithium ion battery and the like is manufactured and used.

A lithium ion battery having a structure, which keeps a flat shape without rolling a laminating structure, and includes exposed parts in ends of each of electrodes without covering with electrolyte layers, can be applied.

Although in the above-mentioned embodiment, the example where the present invention was applied to the secondary battery, was described, the present invention is not limited by this example. If the lithium ion battery has the above-mentioned general structure, even a primary battery, which is not conducted to re-charge and re-discharge, can be applied.

As described above, according to the lithium ion battery or a method of manufacturing the lithium ion battery of the present invention, the covering members having electrical insulation covered the positions exposed at least from the electrolyte layers toward the outside in either of one electrode and the positions opposed to the above-mentioned positions on the electrode for protection. As a result of this, when the battery is manufactured or used as a product after manufacturing, owing to some reasons such as structural variations or changes in environment for use, even if the end of one battery is deformed in a manner of approaching the other electrode, the covering members can prevent both electrodes from electrical short circuit, thereby achieving a solution for conventional problems such that an effective electromotive force of the battery seriously decreases, or output can not be conducted at all due to a short circuit between the electrodes.

According to the lithium ion battery or the method of manufacturing the lithium ion battery of the present invention, the covering members have insulation and physical strength such that when pressure is applied to the laminating structure, in which the electrolyte layers, the positive electrode and the negative electrode are laminated, one electrode is electrically insulated from the other electrode. Even if the end of one battery is deformed in a manner of approaching the other electrode, the covering members can prevent both electrodes from electrical short circuit, thereby achieving a solution for conventional problems such that the effective electromotive force of the battery seriously decreases, or output can not be conducted at all due to short circuit between the electrodes.

While the invention has been described with reference to specific embodiment chosen for purpose of illustration, it should be apparent that numerous modifications could be made there to by those skilled in the art without departing from the basic concept and scope of the invention.

What is claimed is:

1. A nonaqueous-electrolyte secondary battery including a laminating structure, in which one of a gel-type and a plasticizing nonaqueous electrolyte layer, a positive electrode and a negative electrode are laminated, comprising:

a covering member having insulation, which covers an exposed end of each of the positive electrode and the negative electrode from an electrolyte layer; and a pair of covering members disposed opposed to each said covering member.

2. A nonaqueous-electrolyte secondary battery according to claim 1, wherein a transition metal chalcogen compound is employed as an active material for the positive electrode; and wherein a material capable of being doped or undoped with lithium is employed as an active material for the negative electrode.

3. A nonaqueous-electrolyte secondary battery including a laminating structure, in which one of a gel-type and plastic nonaqueous electrolyte layer, a positive electrode and a negative electrode are laminated, comprising:

a covering member, disposed at an exposed end of each of the positive electrode and the negative electrode from an electrolyte layer, said covering member having an insulation and physical strength for electrically insulating one electrode from the other electrode when pressure is applied to the laminating structure; and a pair of covering members disposed opposed to each said covering member.

4. A nonaqueous-electrolyte secondary battery according to claim 1 or 3, wherein one of a transition metal sulfide, a transition metal oxide, and a lithium complex oxide of $LiMO_2$ (transition metal M is a material selected from a group consisting, of Co, Ni, and Mn) is employed as an active material for the positive electrode; and a non-graphitizing carbon material and a graphite material capable of being doped and undoped with lithium are employed as an active material for the negative electrode.

5. A nonaqueous-electrolyte secondary battery according to claim 1 or 3, wherein the electrolyte is one of a solid electrolyte and gel-type electrolyte in which lithium salt is included.

6. A nonaqueous-electrolyte secondary battery according to claim 5, wherein the electrolyte is a gel-type electrolyte made of a macromolecular compound employing one of poly(vinylideneflouride) and poly(vinylidenefluoride-cohexafluorpropylene) and includes a nonaqueous solvent and an electrolyte salt.

7. A nonaqueous-electrolyte secondary battery according to claim 1 or 3, wherein a rolled electrode, formed by rolling the positive electrode and the negative electrode in a flat spiral shape, is accommodated in a package case, and ends of the package case are sealed.

8. A method of manufacturing a nonaqueous-electrolyte secondary battery according to claim 1 or 2, wherein the electrolyte is one of a solid electrolyte battery and a gel-type electrolyte gel, and made of a macromolecular solid electrolyte including lithium.

9. A nonaqueous-electrolyte secondary battery according to claim 8, wherein the electrolyte is a gel-type electrolyte made of a macromolecular compound employing one of poly(vinylidenefluoride) and poly(vinylidenefluoride-co-hexafluorpopylene) and including a nonaqueous solvent and an electrolyte salt.

10. A method of manufacturing a nonaqueous-electrolyte secondary battery comprising:

forming a laminating structure, in which one of a gel-type and plastic nonaqueous-electrolyte layer, a positive electrode and a negative electrode are laminated, and applying pressure to the laminating structure from an outside, comprising:

covering an exposed end of each of the positive electrode and the negative electrode from an electrolyte layer with a covering member, said covering member having an insulation and physical strength for keeping an electrically insulated state between one electrode and the other electrode when pressure is applied to the laminating structure; and disposing a pair of covering members opposed to each said covered end of the positive electrode and the negative electrode.

11. A method of manufacturing a nonaqueous-electrolyte secondary battery according to claim 10, wherein one of a metal sulfide a metal oxide, and a lithium mix oxide of $LiMO_2$ (transition metal M is a material selected from a group consisting of Co, Ni, and Mn) is employed as an active material for the positive electrode; and a non-graphitizing carbon material and a graphite material capable of being doped and undoped with lithium is employed as an active material for the negative electrode.

12. A method of manufacturing a nonaqueous-electrolyte secondary battery according to claim 10, wherein a rolled electrode formed by rolling the positive electrode and the negative electrode in a flat spiral shape, is accommodated in a package case, and ends of the package case are sealed.

13. A nonaqueous-electrolyte secondary battery according to claims 1, 3, or 10, wherein said pair of covering members which are disposed opposed to said covering member covering the negative electrode, are disposed on parts of said positive electrode; and wherein said pair of covering members which are disposed opposed to said covering member covering the positive electrode are disposed on parts of the negative electrode.

* * * * *